(12) United States Patent
Ordaz

(10) Patent No.: US 12,038,730 B2
(45) Date of Patent: *Jul. 16, 2024

(54) GARAGE DOOR SYSTEM AND METHOD

(71) Applicant: GMI Holdings, Inc., Mt. Hope, OH (US)

(72) Inventor: Jeffrey Ordaz, American Canyon, CA (US)

(73) Assignee: GMI Holdings, Inc., Mt. Hope, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/836,156

(22) Filed: Jun. 9, 2022

(65) Prior Publication Data

US 2022/0301373 A1 Sep. 22, 2022

Related U.S. Application Data

(63) Continuation of application No. 14/518,731, filed on Oct. 20, 2014, now Pat. No. 11,361,604, which is a continuation of application No. 13/494,952, filed on Jun. 12, 2012, now Pat. No. 8,866,583.

(51) Int. Cl.
*G05B 19/042* (2006.01)
*G07C 9/20* (2020.01)

(52) U.S. Cl.
CPC .............. *G05B 19/042* (2013.01); *G07C 9/20* (2020.01); *G05B 2219/25168* (2013.01); *G05B 2219/25187* (2013.01); *G05B 2219/2628* (2013.01)

(58) Field of Classification Search
CPC ........ G05B 19/042; G05B 2219/25268; G05B 2219/2628; G07C 9/20; G01N 2035/00316
See application file for complete search history.

(56) References Cited

U.S. PATENT DOCUMENTS

| | | | |
|---|---|---|---|
| 4,334,315 A | 6/1982 | Ono | |
| 5,184,009 A | 2/1993 | Wright et al. | |
| 5,402,105 A | 3/1995 | Doyle et al. | |
| 5,684,372 A * | 11/1997 | Fitzgibbon | E05F 15/668 318/466 |
| 5,742,666 A | 4/1998 | Alpert | |
| 6,191,807 B1 | 2/2001 | Hamada et al. | |
| 6,229,276 B1 | 5/2001 | Fitzgibbon et al. | |

(Continued)

FOREIGN PATENT DOCUMENTS

| | | | |
|---|---|---|---|
| JP | 2001160343 A | 6/2001 | |
| JP | 2008283474 A | 11/2008 | |
| WO | WO 2008/085203 | * 7/2008 | ............. G06F 21/00 |

*Primary Examiner* — Vernal U Brown
(74) *Attorney, Agent, or Firm* — Haynes and Boone, LLP

(57) ABSTRACT

A garage door module includes a manual switch, a wireless communication module, a door close/open module, a push logic module, and a housing. The wireless communication module logic module.is configured to receive user commands from a remote garage door server. The door close/open module is configured to direct a garage door opener to open or close a garage door in response to a user command received at the manual switch or the wireless communication module. The push logic module is configured to automatically push garage door status information to the remote garage door server. The housing contains the manual switch, the wireless communication module, the door close/open module, and the push logic module.

20 Claims, 4 Drawing Sheets

(56) References Cited

U.S. PATENT DOCUMENTS

| | | |
|---|---|---|
| 6,310,548 B1 | 10/2001 | Stephens, Jr. |
| 6,317,739 B1 | 11/2001 | Hirata et al. |
| 6,380,923 B1 | 4/2002 | Fukumoto et al. |
| 6,380,930 B1 | 4/2002 | Rumbeke |
| RE37,784 E | 7/2002 | Fitzgibbon et al. |
| 6,553,238 B1 | 4/2003 | Ginzel et al. |
| 6,597,291 B2 | 7/2003 | Tsui |
| 6,768,419 B2 | 7/2004 | Garber et al. |
| 6,791,467 B1 | 9/2004 | Ben-Ze'Ev |
| 6,873,824 B2 | 3/2005 | Flick |
| 6,912,287 B1 | 6/2005 | Fukumoto et al. |
| 6,980,117 B1 | 12/2005 | Kirkland et al. |
| 6,998,977 B2 | 2/2006 | Gregori et al. |
| 7,035,814 B2 | 4/2006 | Malkin et al. |
| 7,071,813 B2 | 7/2006 | Fitzgibbon |
| 7,158,043 B2 | 1/2007 | Kirkland et al. |
| 7,161,470 B2 | 1/2007 | Berquist et al. |
| 7,224,275 B2 | 5/2007 | Fitzgibbon |
| 7,266,344 B2 | 9/2007 | Rodriquez |
| 7,406,167 B2 | 7/2008 | Ooki |
| 7,468,676 B2 | 12/2008 | Styers et al. |
| 7,515,063 B2 | 4/2009 | Brundula |
| 7,532,709 B2 | 5/2009 | Styers et al. |
| 7,567,219 B2 | 7/2009 | Mori et al. |
| 7,602,283 B2 | 10/2009 | John |
| 7,778,604 B2 | 8/2010 | Bauman et al. |
| 7,928,965 B2 | 4/2011 | Rosenblatt et al. |
| 8,542,093 B2 | 9/2013 | Rodriguez |
| 8,587,404 B2 | 11/2013 | Laird |
| 8,653,962 B2 | 2/2014 | Maeng |
| 8,952,783 B2 | 2/2015 | Fitzgibbon |
| 9,077,716 B2 | 7/2015 | Myers et al. |
| 9,756,233 B2 | 9/2017 | Lee |
| 11,361,604 B1 * | 6/2022 | Ordaz .................. G05B 19/042 |
| 2001/0008390 A1 | 7/2001 | Berquist et al. |
| 2001/0015123 A1 | 8/2001 | Nishitani et al. |
| 2002/0156829 A1 | 10/2002 | Yoshimine |
| 2002/0178007 A1 | 11/2002 | Slotnick et al. |
| 2003/0066047 A1 | 4/2003 | Watase |
| 2003/0066413 A1 | 4/2003 | Nishitani et al. |
| 2003/0071724 A1 | 4/2003 | D'Amico |
| 2003/0137908 A1 | 9/2003 | Nishitani et al. |
| 2004/0123105 A1 | 6/2004 | Himmel et al. |
| 2004/0139400 A1 | 7/2004 | Allam et al. |
| 2005/0012631 A1 | 1/2005 | Gregori et al. |
| 2005/0024230 A1 | 2/2005 | Chuey |
| 2005/0174250 A1 | 8/2005 | Dierking |
| 2005/0207599 A1 | 9/2005 | Fukumoto et al. |
| 2005/0246763 A1 | 11/2005 | Corcoran et al. |
| 2006/0080310 A1 | 4/2006 | Gordon et al. |
| 2006/0128408 A1 | 6/2006 | Perttila et al. |
| 2006/0202815 A1 | 9/2006 | John |
| 2006/0220834 A1 * | 10/2006 | Maeng ................. G08B 25/007 340/5.71 |
| 2007/0146118 A1 | 6/2007 | Rodriquez |
| 2007/0262848 A1 | 11/2007 | Berstis |
| 2008/0062000 A1 | 3/2008 | Styers et al. |
| 2009/0273878 A1 | 11/2009 | Lee et al. |
| 2010/0127882 A1 | 5/2010 | Sitarksi |
| 2010/0142448 A1 * | 6/2010 | Schlicht ............. H04W 28/021 370/328 |
| 2010/0289661 A1 | 11/2010 | Styers et al. |
| 2010/0297941 A1 * | 11/2010 | Doan ................... G08C 17/02 455/41.2 |
| 2011/0205965 A1 | 8/2011 | Sprigg et al. |
| 2011/0311052 A1 * | 12/2011 | Myers .................... H04L 63/10 380/270 |
| 2013/0257611 A1 | 10/2013 | Lamb |
| 2015/0148983 A1 | 5/2015 | Fitzgibbon |

\* cited by examiner

GARAGE DOOR SYSTEM AND METHOD

RELATED APPLICATIONS

This application is a continuation of U.S. patent application Ser. No. 14/518,731, filed Oct. 20, 2014, which is continuation of U.S. patent application Ser. No. 13/494,952, filed Jun. 12, 2012, issued as U.S. Pat. No. 8,866,583 on Oct. 21, 2014, both of which is are incorporated herein by reference in their entirety.

BACKGROUND OF THE INVENTION

The present invention relates generally to garage door systems and methods and more specifically to garage door systems and methods for monitoring existing garage doors.

Many existing homes with garages have a garage door opener. A typical garage door opener includes an electrical motor and a chain that links the electrical motor to the garage door. When the electrical motor rotates, the garage door can either open upwards or close downwards.

Many garage door systems also use a manual switch that is typically located on a wall inside the garage. When the switch is pressed, the garage door can be closed or opened depending upon the user's desire.

It is not uncommon for users to leave home wondering whether the garage door was left open. Oftentimes, the user has left home and is remotely located and too far away or it is too inconvenient to return home to determine the garage door state.

If the user wishes to always remotely confirm that the garage door was closed such as via the Internet for example, the user must uninstall and replace the conventional existing garage door system with one that can be operated remotely. The user must also maintain the manual switch separate and apart from any newly installed garage door monitoring system.

The present invention addresses one or more of the aforementioned disadvantages of conventional garage door opening systems.

BRIEF SUMMARY OF THE INVENTION

Various aspects of a universal method and system for controlling existing garage doors can be found in exemplary embodiments of the present invention.

In a first embodiment, the universal system includes a module that incorporates Wifi communication circuitry to receive instructions wirelessly from a remote user via a communication network such as the Internet. The module also includes circuitry to automatically push, without user request, garage door status information to a remotely located server via the Internet.

In this manner, even when a user has left home wondering whether the garage door was left open and the user is remotely located, too far away or is too inconvenient to return home to determine the garage door state, the user can utilize a computing device, mobile device or the like to access garage door status information and can remotely direct the module to open, close or lock the garage door.

Another advantage is that the module of the present invention incorporates circuitry to direct the garage door opener to close or open the existing garage door when the module is manually operated by a user. Thus, the module is universal and can replace manual switches or consoles typically installed on a garage wall to control existing garage door openers. Once installed, the module of the present invention can operate both manually and automatically to control existing garage door openers and systems based upon user request. Users need not uninstall and replace conventional existing garage door systems nor do users need to maintain manual switches separate and apart from any newly installed garage door monitoring system.

A further understanding of the nature and advantages of the present invention herein may be realized by reference to the remaining portions of the specification and the attached drawings. Further features and advantages of the present invention, as well as the structure and operation of various embodiments of the present invention, are described in detail below with respect to the accompanying drawings. In the drawings, the same reference numbers indicate identical or functionally similar elements.

DETAILED DESCRIPTION OF THE INVENTION

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth to provide a thorough understanding of the present invention. However, it will be obvious to one of ordinary skill in the art that the present invention may be practiced without these specific details. In other instances, well-known methods, procedures, components, and circuits have not been described in detail as to not unnecessarily obscure aspects of the present invention.

Figure 1:
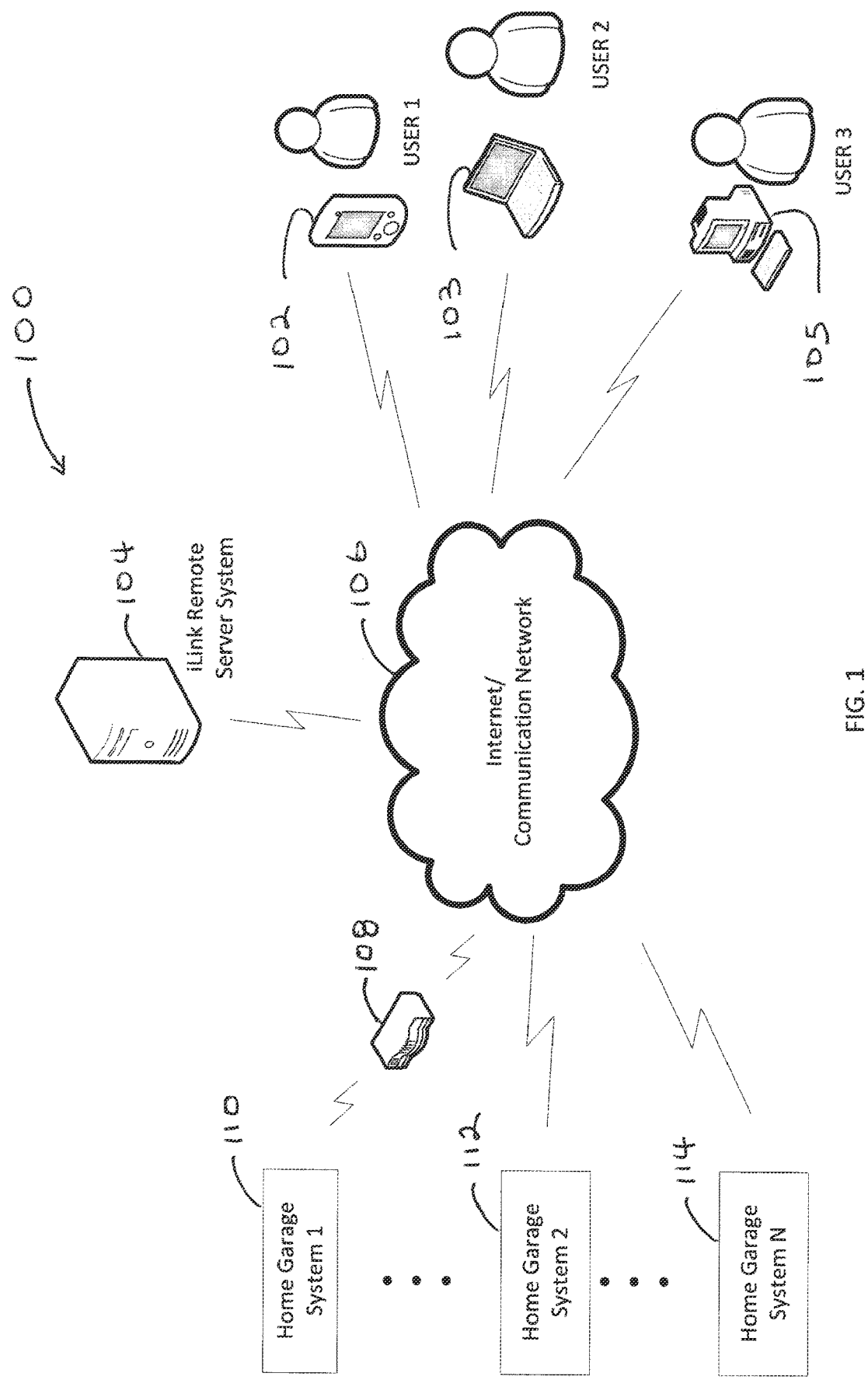
FIG. 1 illustrates a garage door system according to an exemplary embodiment of the present invention.

FIG. 1 illustrates garage door system 100 according to an exemplary embodiment of the present invention.

In FIG. 1, garage door system 100 comprises iLink remote server system 104 communicably coupled via Internet/communication network 106 and wireless router 108 to home garage system 1 designated 110. Internet/communication network 106 can be any communication network that allows data to be communicated or transferred from one point to another. Such a network might be wired or wireless as deemed necessary to be consistent with the spirit and scope of the present invention.

Although not shown, home garage system 110 includes a garage door and a corresponding power unit (electrical motor) for controlling the garage door as well as a wall unit switch for manually controlling the garage door.

In FIG. 1, using tablet 102, USER 1 can log into iLink remote server system 104 to access home garage system 110. Thus, USER 1 remotely located from his or her home garage system 110 can use iLink remote server system 104 to access various functionalities relating to the garage door within home garage system 110.

Similarly, USER 2 can also access home garage system 2 designated 112, which is also communicably coupled to iLink remote server system 104 via Internet/Communication network 106. Specifically, USER 2 can employ laptop 103 to access iLink remote server system 104 via Internet/communication network 106.

USER 3 can also remotely access home garage system N designated as 114. Specifically, USER 3 can employ desktop computer 105 to access iLink remote server system 104 via Internet/communication network 106.

USER 1, USER 2, and/or USER 3 can then perform functionalities related to each corresponding home garage system consistent with the spirit and scope of the present invention. Although not shown, further descriptions of various embodiments of the present invention will be described with reference to the following figures.

Figure 2:
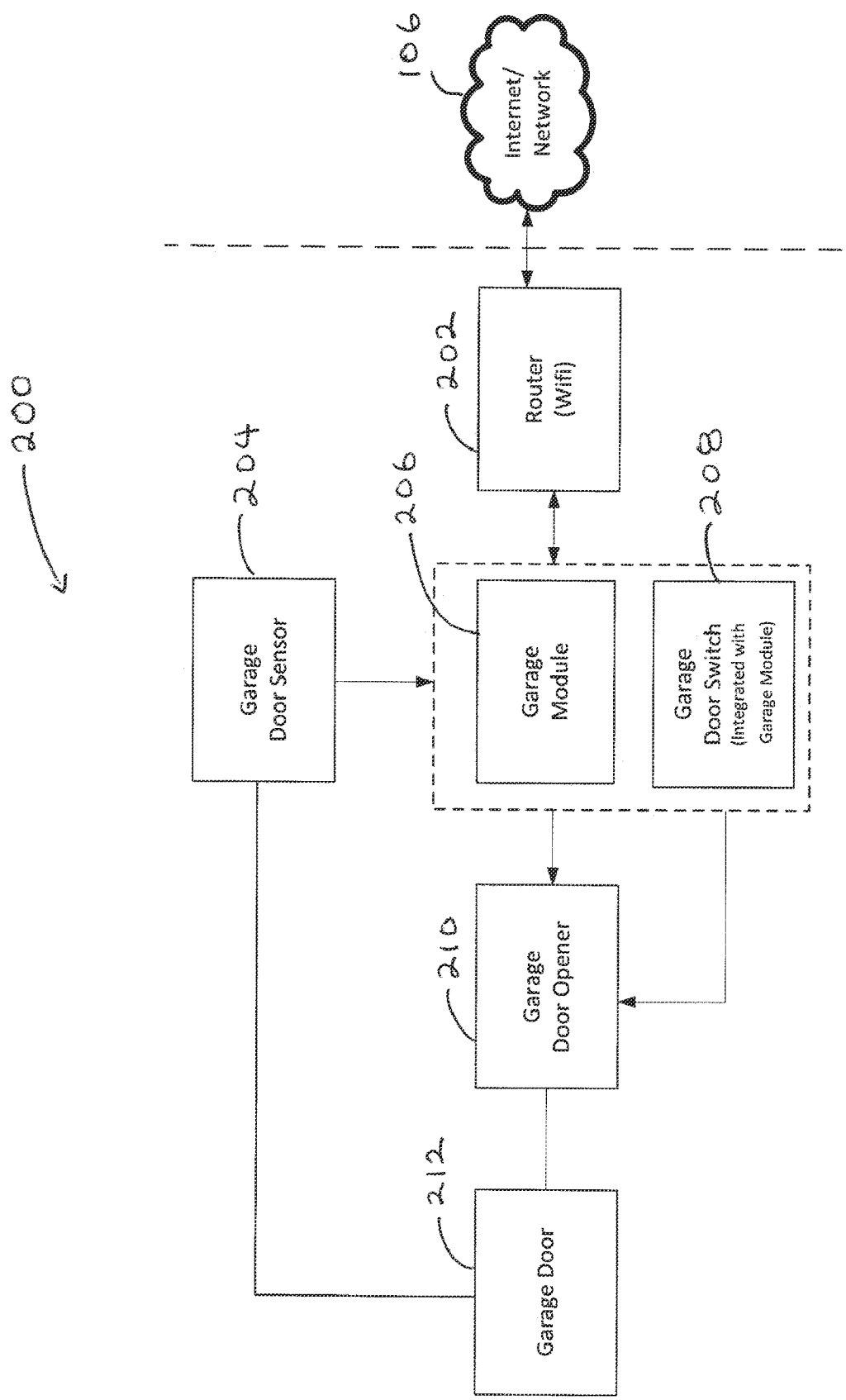
FIG. 2 illustrates a home garage system according to an exemplary embodiment of the present invention.

FIG. 2 illustrates home garage system 200 according to an exemplary embodiment of the present invention.

In FIG. 2, home garage system 200 shows various exemplary components of home garage systems 110, 112 and 114 of FIG. 1. Home garage system 200 comprises router 202 communicably coupled to garage module 206. Router 202 receives data from Internet/communication network 106 of FIG. 1. Router 202 is a WiFi router capable of receiving data from the Internet and that is compliant with 802.11 standards. Router 202, as mentioned, is capable of receiving data from Internet/communication network 106 and transmitting received data to garage module 206.

Such data is transferred wirelessly from router 202 to garage module 206. Garage module 206 might be located within receiving distance of router 202 such that both components can effectively communicate with each other. Router 202 is also capable of receiving data from garage module 206 and transferring that data via Internet/communication network 106 to the iLink remote server system 104 of FIG. 1.

Garage module 206 is capable of receiving data from router 202 and transferring that data to garage door opener 210. Such data might comprise instructions to open or close a garage door 212. Garage module 206 executes such instructions and directs garage door opener 210 to open or close garage door 212.

Although shown separately in FIG. 2, garage module 206 and garage door switch 208 are fully integrated unlike conventional garage door opener systems. An advantage of the present invention is that garage module 206 and its integrated garage door switch 208 can replace a manual wall switch for an existing garage door system without the need to uninstall and replace entire garage units, potentially saving many homeowners substantial amounts of money as well as labor costs.

Garage module 206 is also communicably coupled to garage door sensor 204. Garage module 206 can receive data (e.g., garage door status information) from garage door sensor 204 and push such data via router 202 and Internet/communication 30 network 106 to the iLink remote server system 104 of FIG. 1.

Garage door sensor 204 is physically coupled to garage door 212, which is typically seven feet in height. Garage door 212 can be raised to open the garage door or lowered to close the garage door.

Garage door sensor 204 might be a magnetic sensor such as a reed switch attached to the moving garage door 212. The corresponding actuating magnet for the reed switch might be oppositely disposed and coupled to the frame (non-moving) of garage door 212. When the reed switch and magnet are aligned, a closed state or "garage door is closed" signal is relayed to garage module 206, and when the switch and magnet are not in alignment, an open state or "garage door is open" signal is sent to garage module 206.

Another method for determining the garage door state is to use logic circuitry in garage module 206. Initially, the logic board is first calibrated via a computing device (coupled to the logic board via the USB port 520 of FIG. 5C, for example)). The amount of time it takes for the garage door to open from a closed state is determined and stored. The amount of time to close the garage from an open state is also determined and stored. Thus, if the amount of time for the garage to close or open is shorter than the stored time, the garaged door is open (or closed).

Garage door sensor 204 sends such open and closed state information to garage module 206 for communication to the iLink remote server system 104. Garage door sensor 204 sends the current state information whenever there is a change of state and based on optional pre-set times such as every two, five, ten, thirty or sixty minutes.

Garage module 206 sends this current state information to iLink remote server system 104 of FIG. 1. Specifically, the current state information is sent from garage module 206 to garage control application 306 of FIG. 3. If a communication error occurs during the transmission, garage door module 206 queues the status information and continues to retry until the transmission becomes successful.

Garage door opener 210 is an existing conventional overhead garage door. Garage door opener 210 includes an electric motor and a chain drive that is indirectly coupled to the garage door 212. When the electric motor is operational, garage door 212 can be either opened or closed via the chain belt drive (not shown).

As noted, an advantage of the present invention is that the garage module 206 (incorporating garage door switch 208) is universal and can be used to operate any existing brand of garage door opener. When installed, garage module 206 can simply replace the existing manual push button that manually opens and closes the garage door. Unlike traditional systems, garage module 206 is not specific to any garage door opener and is versatile and can be used with any conventional garage door opener. Further description and operation of the home garage system 200 are illustrated with reference to FIGS. 3 and 4 below.

Figure 3:
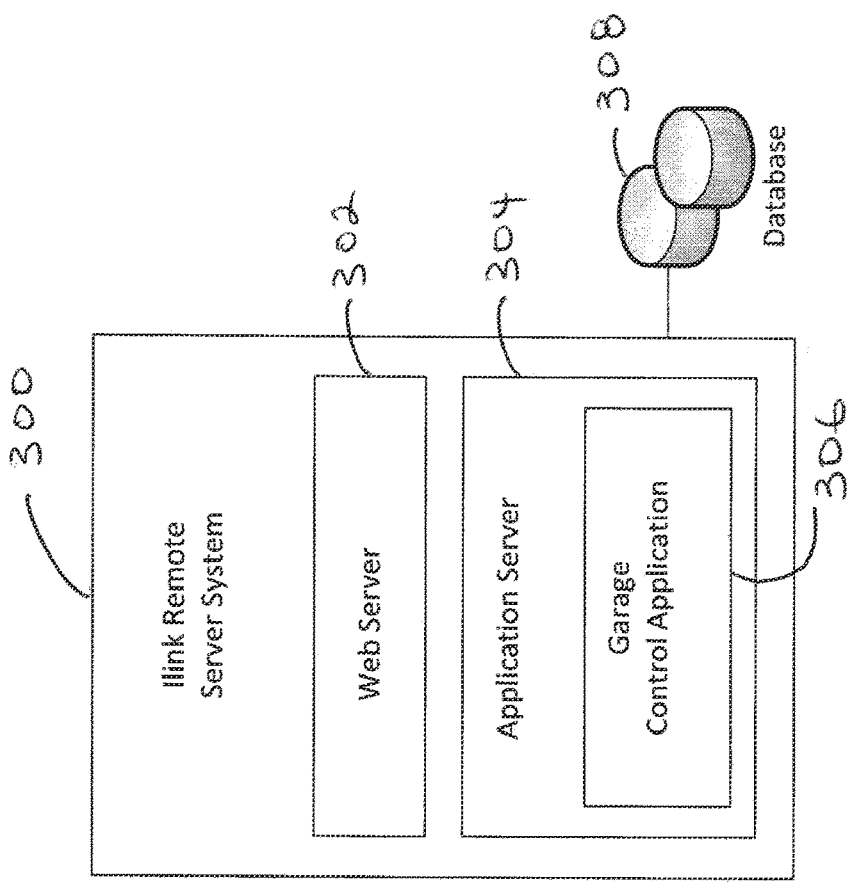
FIG. 3 illustrates an Think remote server system according to an exemplary embodiment of the present invention.

FIG. 3 illustrates iLink remote server system 300 according to an exemplary embodiment of the present invention.

In FIG. 3, iLink remote server system 300 includes web server 302 and application server 304. Web server 302 functions to serve up and host a website (not shown) that can be accessed by USER 1, USER 2 and USER 3 of FIG. 1. Among other functionalities, users can access this website to determine home garage door status information as well as issue corresponding commands to "open" and "close" remotely located garage doors. Web server 302 can be hardware, software or a combination of both.

Application server 304 controls all software applications accessible by USER 1, USER 2 and USER 3. Users can access garage control application 306, which comprises one or more software instructions to control the garage doors within remotely located home garage systems 110, 112, 114 of FIG. 1. Garage control application 306 may also include one or more software instructions enabling a user to view garage status information. Application server 304 is also communicably coupled to database 308, in which information for all registered users and their garage modules are stored.

Figure 4:
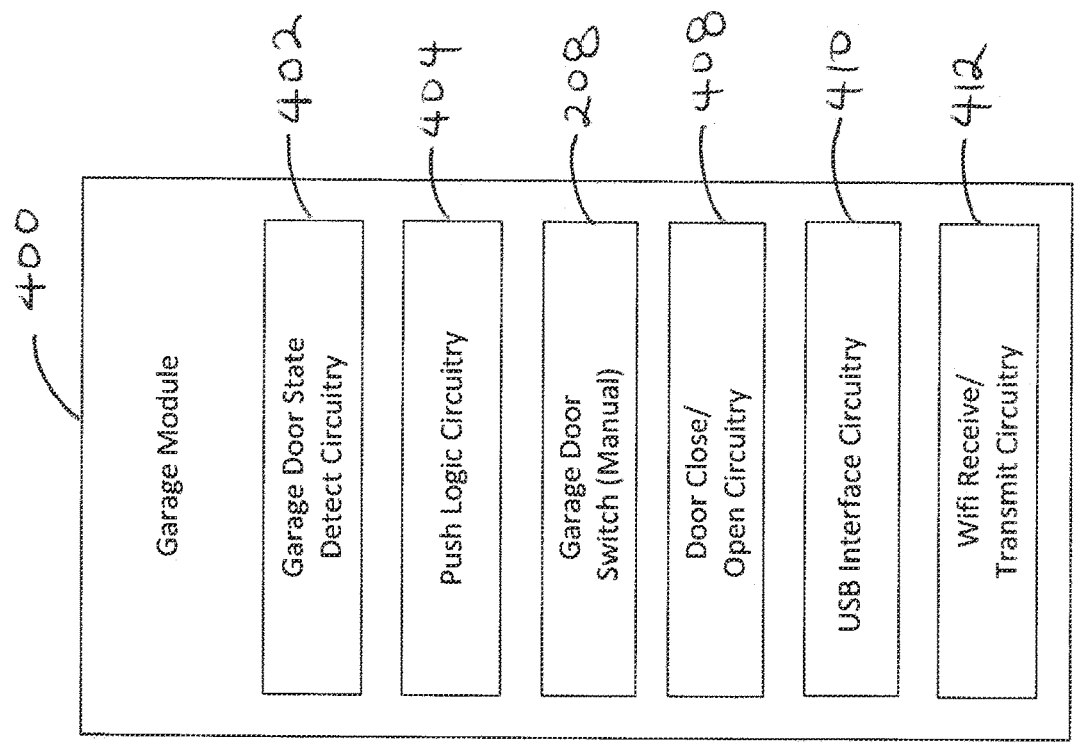
FIG. 4 illustrates garage module according to an exemplary 10 embodiment of the present invention.

FIG. 4 illustrates garage module 400 according to an exemplary embodiment of the present invention.

In FIG. 4, garage module 400 might exemplify garage module 206 of FIG. 2. As shown, garage module 400 includes garage door state detect circuitry 402 that stores the state of garage door 212 (FIG. 2). This information, that is whether the garage door is open or closed, is typically received via garage door sensor 204 of FIG. 2.

When a particular state is detected, push logic circuitry 404 pushes garage door status information to garage control application 306 automatically and based on pre-defined time intervals designated by the user. In one embodiment, information is pushed only if there is a status change in the garage state.

Further, one or more software code instructions for applying asynchronous polling can be employed by garage control application 306. Asynchronous polling constantly polls (or pings) garage module 206 so that when a communication error occurs during transmission, garage control application 306 is aware of the error and users can receive correct garage door status information. An advantage of the present invention is that garage door status information is pushed (as opposed to pulling) to Think remote server system 300 (104).

Although data can be pulled as well, the present invention preferably pushes garage status information when there is change in the status of the garage. For example, if the garage door status changes from "open" to "closed," that information is pushed to the remote server. In this manner, unlike other existing systems, users need not request garage status information in order to receive such information. Not only does pushing avoid inundating the server with requests, users need not await responses to their status information requests as such status information is already available.

In FIG. 4, garage module 400 also includes garage door switch 208 as well as door close/open circuitry 408. Thus, another advantage of the present invention is that garage switch 406 is integrated within the garage module 400. In this manner, garage module 400 is universal and can be utilized with existing garage door systems. Users need not purchase new garage door system that offers remote monitoring capabilities.

Garage door switch 208 preferably includes a push button (e.g., push button 514 of FIG. 5C) that manually allows users to control the garage door irrespective of the current state of garage door 212 as dictated by garage module 400. Garage module 400 also includes door close/open circuitry 408 that receives instructions from USER 1, 2 or 3 to close or open garage door 212. In turn, door close/open circuitry interprets the user's instructions and directs the garage door opener to either open or close the garage door. Such directive might include either opening or closing circuitry that activates the garage door opener electrical motor.

Garage module 400 also includes USB (Universal Serial Bus) interface circuitry 410 and Wifi receive/transmit circuitry 412. As implied by its name, Wifi receive/transmit circuitry 412 can receive or transmit data to and from router 202 of FIG. 2. Specifically, Wifi receive/transmit circuitry 412 processes remote commands received from users via Internet/Communication network 106 and router 202 before being processed at garage module 206.

Use and operation of the present invention will now be described with reference to FIGS. 1, 2, 3 and 4. A user begins by installing garage module 400 of the present invention to replace a pre-existing manual switch on a garage wall that controls an existing garage door opener. Once the garage module 400 is installed, the user is ready to begin utilization of the present invention.

In FIG. 1, USER 1 has left home and is unsure as to whether the garage door 212 (FIG. 2) is open or closed. That is, USER 1 is unsure as to whether the garage door has been lowered to close the garage door or raised to open the garage door. USER 1 begins by using tablet 102 to log into iLink remote server system 104 via Internet/communication network 106. USER 1 uses an iLink mobile application installed on tablet 102 or may simply utilize a browser optimized for mobile access to access iLink remote server system 104.

Specifically, USER 1 accesses garage control application 306 on iLink 20 remote server system 300. USER 1 can then view the status of garage door 212 specifically as to whether the garage door 212 is open or closed. Status information about garage door 212 is pushed on a continuous basis by garage module 206 (e.g., via push logic circuitry 404 of FIG. 4) to the iLink remote server system 104. In this manner, information or garage door status need not be pulled from garage module 206 since the information is already available at iLink remote server system 104.

If garage door 212 is open, USER 1 can use garage control application 306 to close garage door 212 by issuing a command at garage control application 306. Garage control application 306 then sends the user request via Internet/Communication network 106 and router 202 to garage module 206.

USER 1's request is received by garage module 206 and specifically by door close/open circuitry 408. In turn, door close/open circuitry 408 directs garage door opener 210 to perform the user request by closing the garage door.

One may also change the garage door 212 status by pressing garage door switch 208 which is integrated with garage module 206. In this manner, users can remotely access, view and control their own garage doors remotely in a convenient manner.

Figure 5B:
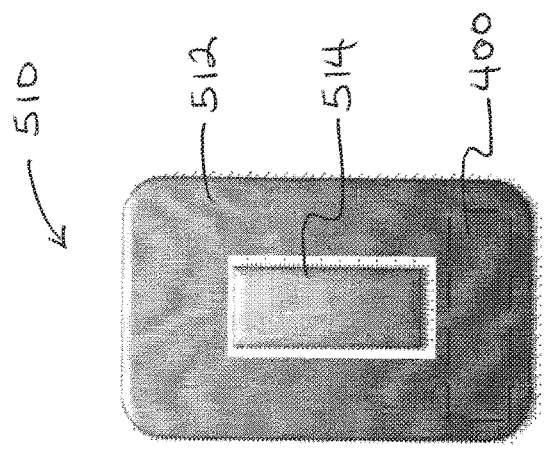
FIG. 5B illustrates a front view of a faceplate system according to an exemplary embodiment of the present invention.
Figure 5D:
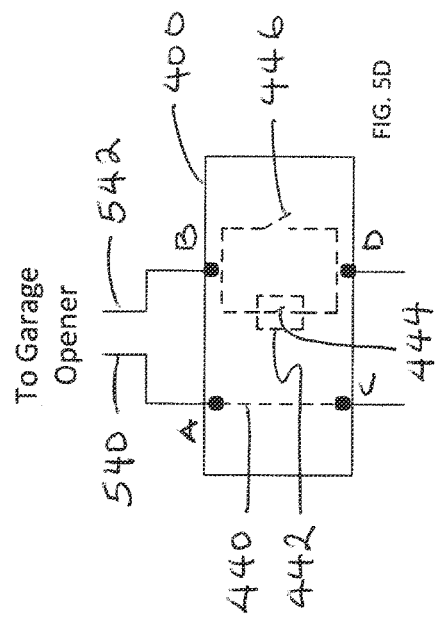
FIG. 5D illustrates a garage module coupled to a main line as installed on a garage wall.
Figure 5A:
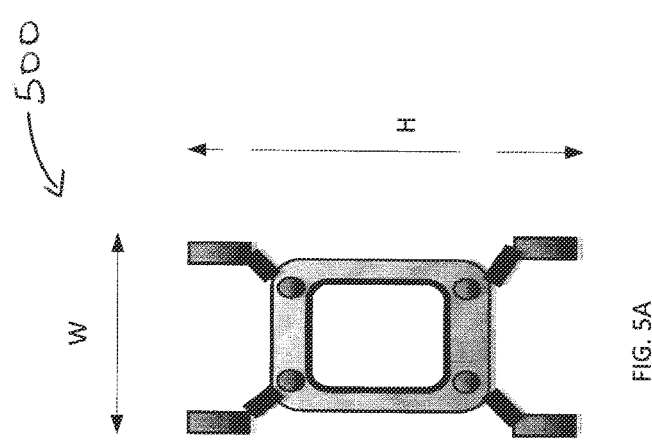
FIG. 5A illustrates a front view of a baseplate according to an exemplary embodiment of the present invention

FIG. 5A illustrates a front view of base plate 500 according to an exemplary embodiment of the present invention.

Upon uninstalling an existing manual switch, base plate 500 is 10 installed to receive garage module 206 (or 400). An exemplary width W of base plate 500 is 2.5 inches; an exemplary height H is 4.5 inches. Once base plate 500 is installed, followed by garage module 206 (or 400), faceplate system 510 of FIG. 5B is installed over the module.

FIG. 5B illustrates a front view of faceplate system 510 according to an exemplary embodiment of the present invention. As shown, faceplate system 510 includes cover 512, push button 514 and garage module 206 (or 400) shown beneath cover 512 as hatched lines. Cover 512 secures the module in place. Push button 514 is employed by users to manually operate the garage door.

Figure 5C:
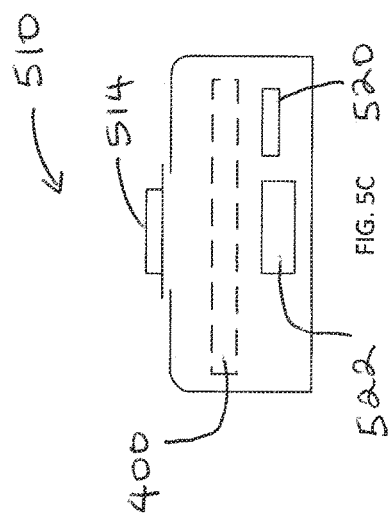
FIG. 5C shows a bottom view of the faceplate system of FIG. 5B.

FIG. 5C shows a bottom view of faceplate system 510 showing garage module 206 (or 400) and push button 514. Faceplate system 510 also includes USB port 520 and groove 522 for receiving wiring connected to the module contained therein.

FIG. 5D illustrates one connection of garage module 400 to replace an existing manual switch in accordance with an exemplary embodiment of the present invention.

In FIG. 5D, after an existing manual switch (not shown) for a conventional garage opener is removed, garage module 400 is connected to the garage door opener at terminals A, B, C and D. That is, line 540 is connected to garage module 400 at terminal A and terminal C, while line 542 is connected to garage module 400 at terminal B and terminal D.

In FIG. 5D, the hashed lines are internal circuitry within garage module 400. Hashed line 440, for example, is internal circuitry that connects terminals A and C. Garage module 400 comprises logic circuit 442 having a logic switch 444 both of which are connected in parallel with manual switch 446.

When garage module 400 receives user instructions via its Wifi circuitry (not shown) to close or open the garage door, logic circuit 442 closes the logic switch 444 to execute the user's instructions. On the other hand, if switch 446 is depressed by the user, line 542 is closed to trigger the garage door opener to either close or open the garage door. A skilled artisan will realize that this is but one exemplary technique for using garage module 400 to replace an existing manual switch.

Garage module 206 might use a combination of line 540 and 542 in FIG. 5D and an AC power adaptor (not shown) as primary sources of power; and a lithium battery or power capacitor (not shown) for backup if an electrical power failure occurs so that garage module 206 can still receive and queue status information for transmission until power supply is restored.

In another embodiment, the garage module of the present invention can replace the manual switch or control console of the existing garage door opener. The system can provide controls of 'open/close', 'lock', and 'light.' The system of the present invention also facilitates Internet access via an 802.11 Wifi-compliant wireless transmitter/receiver and a router. In one embodiment, the electronic module includes a TCP/IP 2.4 GHz radio processor and a Cortex M0 32 bit ARM microcontroller. One or more software code instructions stored in flash memory execute on the ARM microcontroller governing overall operation and communication. The software code instructions allow provisioning by means of the USB port using a computing device as well as configuring any requisite WEP or WPA/WPA2 password that may be required for router access. This configuration allows pairing of the garage module and the router. The one or more software code instructions also monitor the garage door status information using a magnetic reed switch mounted on the garage door. The software code instructions also use an internal serial interface to control the Wifi radio processor. The garage door module comprising the radio processor and microcontroller can respond to query responses and can remotely control the garage door. A query is initiated on the remote server which connects to the IP address of the radio processor via the Internet or other communication network. Here, the Wifi radio has a unique MAC (Media Access Control) address. The garage module may also be remotely directed to open/close the door, turn on the light, or lock the garage door. In one embodiment, garage door control is achieved by an optically isolated switch in parallel with the push button switch connected to the microcontroller.

While the above is a complete description of exemplary specific embodiments of the invention, additional embodiments are also possible. Thus, the above description should not be taken as limiting the scope of the invention, which is defined by the appended claims along with their full scope of equivalents.

What is claimed is:

1. A garage door module comprising:
    a manual switch;
    a wireless communication module configured to receive user commands from a remote garage door server;
    a door close/open module configured to direct a garage door opener to open or close a garage door in response to a user command received at the manual switch or the wireless communication module;
    a push logic module configured to automatically push garage door status information to the remote garage door server; and
    a housing containing the manual switch, the wireless communication module, the door close/open module, and the push logic module.

2. The garage door module of claim 1, further comprising:
    a garage door state detection module configured to detect a state of the garage door.

3. The garage door module of claim 2, wherein the garage door state detection module is configured to receive garage door state information from a garage door sensor.

4. The garage door module of claim 2, wherein the push logic module is configured to automatically push the garage door status information to the remote garage door server upon the garage door state detection module detecting a change in the state of the garage door.

5. The garage door module of claim 2, wherein the push logic module is configured to automatically push the garage door status information to the remote garage door server periodically at pre-defined time intervals.

6. The garage door module of claim 2, wherein the push logic module is configured to automatically push the garage door status information to the remote garage door server upon the garage door state detection module detecting a change in the state of the garage door and periodically at pre-defined time intervals.

7. The garage door module of claim 1, wherein the wireless communication module is configured to communicate with the remote garage door server via a wireless Internet router.

8. The garage door module of claim 1, wherein the push logic module is configured to detect a communication error between the push logic module and the remote garage door server and, in response to detecting the communication error, queue garage door status information for retransmission.

9. A garage door module comprising:
    a wireless communication module configured to receive user commands from a remote garage door server;
    a garage door state detection module configured to detect a state of a garage door; and
    a push logic module configured to automatically push garage door status information to the remote garage door server.

10. The garage door module of claim 9, further comprising:
    a manual switch; and
    a door close/open module configured to direct a garage door opener to open or close a garage door in response to a user command received at the manual switch or the wireless communication module.

11. The garage door module of claim 10, further comprising:

a garage door sensor, wherein the garage door state detection module is configured to receive garage door state information from the garage door sensor.

12. A garage door system comprising:
a remote garage door server; and
a garage door module comprising:
    a wireless communication module configured to receive user commands from the remote garage door server;
    a garage door state detection module configured to detect a state of a garage door; and
    a push logic module configured to automatically push garage door status information to the remote garage door server.

13. The garage door system of claim 12, wherein the garage door module further comprises:
a manual switch; and
a door close/open module configured to direct a garage door opener to open or close a garage door in response to a user command received at the manual switch or the wireless communication module.

14. The garage door system of claim 13, wherein the garage door status information is stored in memory at the remote garage door server prior to a user device establishing communication with the remote garage door server and the remote garage door server is remotely accessible by the user device to retrieve the garage door status information from the memory when the user device establishes communication with the remote garage door server.

15. The garage door system of claim 13, wherein the garage door module is configured to instruct the garage door opener to lock the garage door in response to receipt of a lock instruction from the remote garage door server.

16. The garage door system of claim 12, further comprising:
a garage door sensor configured to transmit garage door state information to the garage door state detection module.

17. The garage door system of claim 12, wherein the garage door state detection module is configured to detect a state of a garage door based on an elapsed time of travel of the garage door.

18. The garage door system of claim 12, wherein the garage door module further comprises a universal serial bus (USB) port configured to couple the garage door state detection module to an external computing device to calibrate the garage door state detection module.

19. The garage door system of claim 12, wherein the remote garage door server is configured to asynchronously poll the garage door module.

20. The garage door system of claim 19, wherein the remote garage door server is configured to detect a communication error between the remote garage door server and the garage door module based on the asynchronous polling.

* * * * *

UNITED STATES PATENT AND TRADEMARK OFFICE
CERTIFICATE OF CORRECTION

PATENT NO. : 12,038,730 B2
APPLICATION NO. : 17/836156
DATED : July 16, 2024
INVENTOR(S) : Jeffrey Ordaz It is certified that error appears in the above-identified patent and that said Letters Patent is hereby corrected as shown below:

On the Title Page

Please correct Item (57) the Abstract as follows:
A garage door module includes a manual switch, a wireless communication module, a door close/open module, a push logic module, and a housing. The wireless communication module is configured to receive user commands from a remote garage door server. The door close/open module is configured to direct a garage door opener to open or close a garage door in response to a user command received at the manual switch or the wireless communication module. The push logic module is configured to automatically push garage door status information to the remote garage door server. The housing contains the manual switch, the wireless communication module, the door close/open module, and the push logic module.

Signed and Sealed this
Fifteenth Day of October, 2024

Katherine Kelly Vidal
*Director of the United States Patent and Trademark Office*